United States Patent
Li et al.

(10) Patent No.: US 8,439,179 B2
(45) Date of Patent: May 14, 2013

(54) HYDRAULIC CONTROL DEVICE FOR HYBRID TRANSMISSION

(75) Inventors: Shufu Li, Hangzhou (CN); Jian Yang, Hangzhou (CN); Tong Zhang, Jinshan District (CN); Wei Yu, Jinshan District (CN); Zhitao Ma, Jinshan District (CN); Haisheng Yu, Jinshan District (CN); Yude Xiang, Jinshan District (CN)

(73) Assignees: Shanghai Maple Guorun Automobile Co., Shanghai (CN); Zhejiang Geely Holding Group, Hang zhou (CN)

( * ) Notice: Subject to any disclaimer, the term of this patent is extended or adjusted under 35 U.S.C. 154(b) by 0 days.

(21) Appl. No.: 13/371,622

(22) Filed: Feb. 13, 2012

(65) Prior Publication Data

US 2012/0211326 A1 Aug. 23, 2012

Related U.S. Application Data

(63) Continuation of application No. PCT/CN2010/001284, filed on Aug. 24, 2010.

(30) Foreign Application Priority Data

Aug. 24, 2009 (CN) .......................... 2009 1 0194472

(51) Int. Cl.
*F16H 61/68* (2006.01)

(52) U.S. Cl.
USPC ..................................... 192/221; 192/48.601

(58) Field of Classification Search ........................ None
See application file for complete search history.

(56) References Cited

U.S. PATENT DOCUMENTS

| 4,867,732 A * | 9/1989 | Soga et al. ..................... 477/49 |
| 5,984,818 A | 11/1999 | Ryu |
| 2008/0256943 A1 | 10/2008 | Shimizu et al. |

FOREIGN PATENT DOCUMENTS

| CN | 1862062 A | 11/2006 |
| CN | 101506549 A | 8/2009 |
| CN | 201487180 U | 5/2010 |

OTHER PUBLICATIONS

Search Report from related PCT patent application PCT/CN2010/001284, Dec. 2, 2012.

* cited by examiner

*Primary Examiner* — Rodney Bonck
(74) *Attorney, Agent, or Firm* — Anderson Gorecki & Rouille, LLP

(57) ABSTRACT

A hydraulic control device for a hybrid transmission is designed such that the cooling and lubrication oil line of the system are in oil communication even before the main oil line pressure reaches the set pressure of the overflow valve, so as to lubricate the transmission as soon as possible. The hybrid transmission design further provides an overpressure protection for the cooler. The hybrid transmission further uses a proportional pressure reducing valve to control the lock-up clutch, thus making for the improvement of its braking performance.

14 Claims, 1 Drawing Sheet

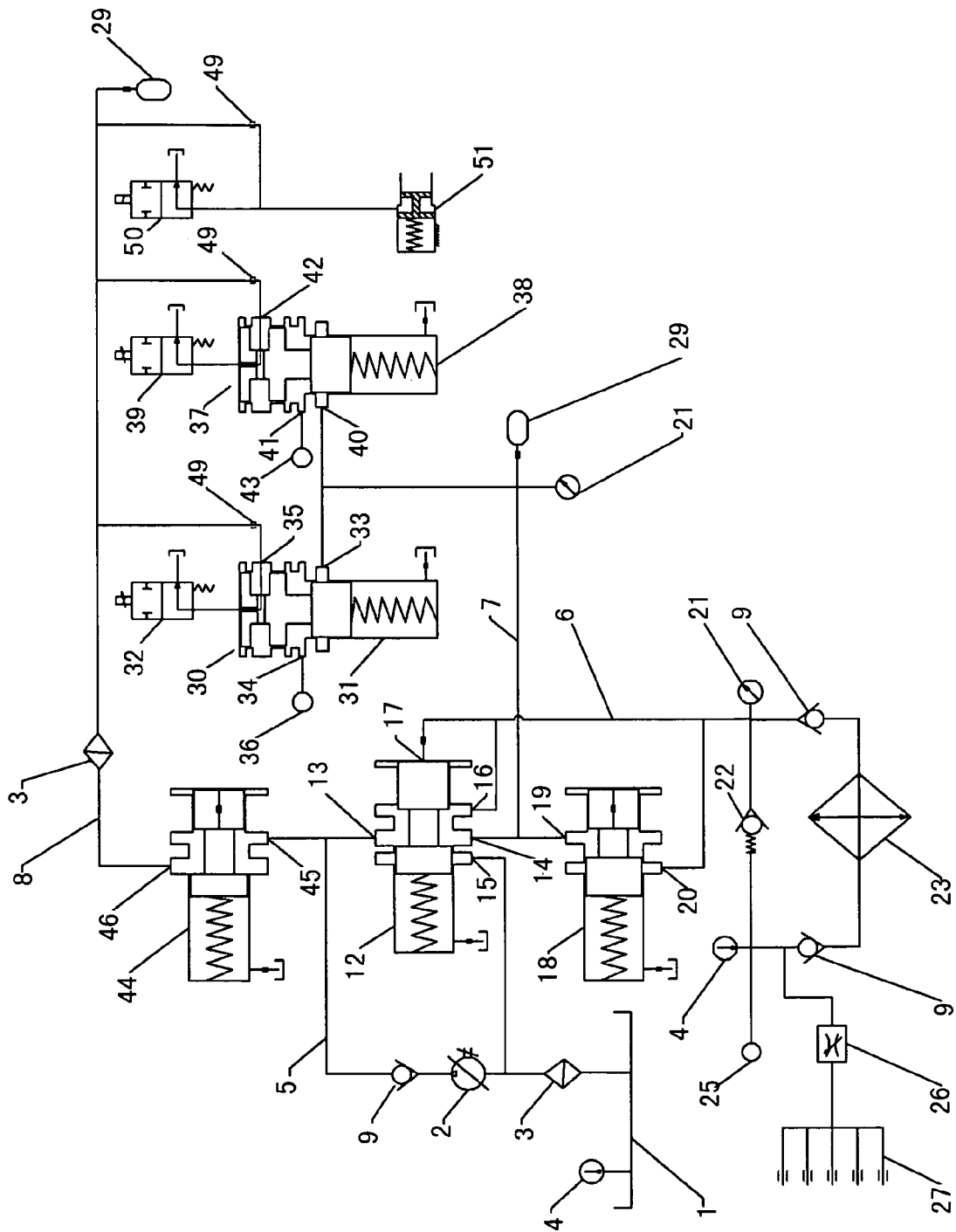

HYDRAULIC CONTROL DEVICE FOR HYBRID TRANSMISSION

This application is a continuation of PCT patent application PCT/CN2010/001284, filed Aug. 24, 2010, which claims priority to Chinese Patent Application No. 200910194472.4 filed Aug. 24, 2009, and Chinese Patent Application No. 200920208313.0, filed Aug. 24, 2009.

TECHNICAL FIELD

The invention relates to a hydraulic control device for a vehicle, in particular, to a hydraulic control device used with a hybrid transmission of a hybrid electrical vehicle.

BACKGROUND

Due to short of energy, enhancement of the public environmental awareness, and increasingly strict regulations of the government, environment friendly electrical vehicle and fuel cell vehicle emerge. However, due to various constraints on the technology, vehicles of such types are difficult to be comprehensively popularized in a short time. Therefore, a hybrid electrical vehicle which has been relatively mature in technology is a comparatively desired choice at present.

As transmissions of a hybrid electrical vehicle mostly employ a planet gear transmission mechanism, such as the hybrid transmission of the Toyota hybrid electrical vehicle Prius, to realize a continuously variable speed change, typically in this type of transmission a hydraulic control device such as provided in a conventional automatic transmission and mainly used for shifting control will not be provided. In order to increase the transmission efficiency of the transmission, it is necessary to provide a lock-up clutch in a hybrid transmission, so as to lock the motor when the transmission is in some special operation conditions, causing the total power of the engine is transmitted to the output shaft; or when driven by electricity, the engine can be locked to prevent the engine from rotating inversely. These lock-up mechanism need hydraulic oil lines to work.

Moreover, corresponding hydraulic oil lines are also needed to realize motor cooling of the hybrid transmission, lubrication of bearings and etc., and parking lock mechanisms and the like. But so far an integrated hydraulic control device for a hybrid transmission has not been appeared. Although there exist many kinds of hydraulic control devices for conventional automatic transmissions, such as hydraulic control device and hydraulic control method for automatic transmission disclosed in Chinese patent application publication NO. CN1862062A, these are not suitable for hydraulic control device used with hybrid transmissions.

SUMMARY OF THE INVENTION

The invention is directed to solve the present problem that hybrid transmissions do not have dedicated hydraulic control devices, and provides a hydraulic control device for a hybrid transmission, which is provided with cooling and lubrication oil lines, clutch control oil lines and solenoid control oil lines.

To achieve the above object, the invention provides following solutions:

A hydraulic control device for a hybrid transmission, comprising an oil pump and a main oil line connected therewith, said mail oil line is connected to a cooling and lubrication oil line, a clutch control oil line and a solenoid control oil line respectively, the main oil line is connected to the cooling and lubrication oil line through an oil orifice on an unloading valve, the cooling and lubrication oil line at the same time is connected to a valve spool control oil port of the unloading valve, while the oil outlet of the unloading valve is connected to an oil inlet of an overflow valve and the clutch control oil line respectively, the oil outlet of the overflow valve is connected to the cooling and lubrication oil line, a cooler is provided on the cooling and lubrication oil line, the clutch control oil line is connected to the oil inlets of first and second proportional pressure reducing valves respectively, a pressure reducing valve is provided between the solenoid control oil line and the main oil line, the solenoid control oil line is connected respectively to the valve spool control oil ports of the first and second proportional pressure reducing valves through an oil orifice, and the solenoid control oil line is also connected to a switch solenoid and a parking lock hydraulic oil cylinder through the oil orifice respectively.

The hydraulic control device for a hybrid transmission according to the invention divides the main oil line into the cooling and lubrication oil line, the clutch control oil line and the solenoid control oil line, thereby can meet the needs of the hybrid transmission for hydraulic control. The first and second lock-up clutches used for locking the engine or motor of the hybrid transmission can be controlled through the clutch control oil line, thereby achieving a better control of the transmission operation condition, and increasing its transmission efficiency. A pressure release valve and an overflow valve can be used to define the pressure in the main oil line, ensuring the normal operation of the hydraulic control device. As the oil orifice on the pressure release valve is directly connected to the cooling and lubrication oil line, the cooling and lubrication oil line would have been in oil communication even when the main oil line pressure of the hydraulic control device does not reach the set pressure of the overflow valve, so that the transmission can be lubricated quickly. The cooler provided on the cooling and lubrication oil line can cool the oil temperature of the oil line, thereby increasing the cooling effect on the motor. The oil orifice has a damping depressurization effect when hydraulic oil passes, the outlet pressure of the solenoid control oil line after the oil orifice is thus greatly reduced. The oil return to the oil tank after passing a pilot valve of the proportional pressure reducing valve connected therewith, when the pilot valve of the proportional pressure reducing valve is powered on, the oil line thereof is totally sealed, the outlet pressure of the oil orifice is thus increased, and the valve spool of the main valve of the proportional pressure reducing valve is forced to act, causing the proportional pressure reducing valve to open and achieving the function of locking the engine or motor. Due to the hysteresis effect of the proportional pressure reducing valve, the transient braking of the lock-up clutch is avoided. Moreover, the solenoid control oil line connects to the switch solenoid and the parking lock hydraulic oil cylinder through the oil orifice respectively, so the hydraulic oil passing the oil orifice directly returns to the oil tank through the switch solenoid before the switch solenoid is powered on. After the switch solenoid is powered on, its valve spool moves to totally seal the oil line, then the outlet pressure of the oil orifice rises, in turn forces the parking lock hydraulic oil cylinder to act, achieving the parking lock function.

As a preference, an overpressure protection check valve parallel to the cooler is provided on the cooling and lubrication oil line. When the pressure in the cooling and lubrication oil line is greater than the set pressure value of the overpressure protection check valve, the overpressure protection check valve opens to decrease the pressure, thereby effects an overpressure protection of the cooler.

As a preference, an accumulation shock absorber is provided on the clutch control oil line and the solenoid control oil line respectively, thereby reducing the pressure fluctuation.

As a preference, the set pressure in the main oil line is 7 bar~9 bar, the set pressure in the solenoid control oil line is 4 bar~6 bar, making for the normal operation of each oil line of the control device.

As a preference, the first and second proportional pressure reducing valves control the engagement of the first and second lock-up clutches of the hybrid transmission through respective oil outlets when the pilot valves thereof are powered on.

As a preference, when the switch solenoid is powered on, the parking lock hydraulic oil cylinder works to effect the parking lock.

To sum up, the invention has the following beneficial effects: (1) the cooling and lubrication oil line of the system being in an oil communication even before the main oil line pressure reaches the set pressure of the overflow valve, so as to lubricate the transmission as soon as possible; (2) providing an overpressure protection for the cooler; (3) using a proportional pressure reducing valve to control the lock-up clutch, thus making for the improvement of its braking performance.

BRIEF DESCRIPTION OF DRAWINGS

The single FIGURE is a principle diagram of the hydraulic circuit according to the invention.

EMBODIMENTS

The following detailed description is merely exemplary in nature and not intended to limit the application or use. Moreover, the invention is not intended to be constrained by any theories stated or suggested in previous Technical Field, Background, and Summary of the invention or the following descriptions.

In the embodiment shown in the FIGURE, the hydraulic control device for a hybrid transmission according to the invention comprises an oil tank 1 and a corresponding oil pump 2. A filter 3 is provided in front of the oil pump 2, a temperature sensor 4 is provided within the oil tank 1 to facilitate the temperature control.

A check valve 9 is provided on the main oil line 5 on the outlet end of the oil pump 2, to prevent the oil from returning. The main oil line 5 connects to the oil inlet 13 of an unloading valve 12 and an oil inlet 45 of a pressure reducing valve 44 respectively. The oil outlet 14 of the unloading valve connects to the oil inlet 19 of an overflow valve 18 and a clutch control oil line 7 respectively. The oil orifice 16 and the valve spool control oil port 17 of the unloading valve and the oil outlet 20 of the overflow valve are commonly connected to the cooling and lubrication oil line 6. The oil drainage port 15 of the unloading valve connects to the oil tank 1.

The cooling and lubrication oil line 6 splits into two lines after passing the pressure sensor 21, with one line connecting to a cooler 23 and two ends of the cooler 23 respectively provided with a check valve 9 for one-way opening, and the other line then connecting to an overpressure protection check valve 22. The two lines merge and connect to a temperature sensor 4 and a motor cooling oil inlet 25 respectively, and connect to an oil inlet 27 of a lubrication system through a speed regulation valve 26.

On the clutch control oil line 7 connected to an oil outlet 14 of the unloading valve is provided a pressure sensor 21 and an accumulation shock absorber 29 to stabilize and control the pressure. The clutch control oil line 7 then connects with the oil inlet 33 of a first proportional pressure reducing valve 30 and the oil inlet 40 of a second proportional pressure reducing valve 37 respectively. The oil outlets 34, 41 of the first and second proportional pressure reducing valve then connect to the oil inlets 36, 43 of the first and second lock-up clutches of the hybrid transmission respectively. If the hybrid transmission has other lock-up clutches, the clutch control oil line 7 may also connect to the oil inlet of these other lock-up clutches.

The main oil line 5 maintains the pressure around 5 bars after the pressure reduction of the pressure reducing valve 44, the oil outlet 46 of the pressure reducing valve connects to the solenoid control oil line 8. The solenoid control oil line 8 thus has a pressure of about 5 bars, for example 4~6 bar. The solenoid control oil line 8 splits into three lines after passing a filter 3 and connects to a accumulation shock absorber 29, wherein the first and second lines connect to the valve spool control oil ports 35, 42 of the first and second proportional pressure reducing valves through an oil orifice 49, respectively, and the third line connects to a switch solenoid 50 and a parking lock hydraulic oil cylinder 51 through an oil orifice 49, respectively.

The following description is directed to demonstrate the operation principle of the oil lines in the hydraulic system according to the invention.

Cooling and Lubrication Oil Line

When the system begins to start, the oil in the oil tank 1 is pressurized by the oil pump 2 and flows into the unloading valve 12 and the pressure reducing valve 44 after passing the check valve 9. As the oil line pressure is relatively low at this moment, the pressure at the oil outlet 14 of the unloading valve does not reach the set pressure of the overflow valve 18, the overflow valve 18 does not open, thereby the oil from the oil orifice 16 of the unloading valve flows into the cooling and lubrication oil line 6. The oil may lubricate the transmission quickly and effect the motor cooling after cooled by the cooler 23.

When the pressure at the oil outlet 14 of the unloading valve gradually rises and exceeds the set pressure of the overflow valve 18, the overflow valve 18 opens, the oil from the oil outlet 20 thereof flows into the cooling and lubrication oil line 6. If the pressure at the oil outlet 14 of the unloading valve keeps rising, the pressure at the oil outlet 20 of the overflow valve rises therewith, then the pressure at the valve spool control oil port 17 of the unloading valve connected to the cooling and lubrication oil line 6 rises, forcing the valve spool of the unloading valve 12 to act. Then the oil drainage port 15 of the unloading valve switches to open, the excess oil flows back to the oil tank 1, keeping the pressure in the main oil line 5 around 8 bars, for example 7~9 bar. When the pressure in the cooling and lubrication oil line 6 is too high, the overpressure protection check valve 22 opens and lower the pressure in the cooling and lubrication oil line 6, thereby effectively protecting the cooler 23.

Clutch Control Oil Line and Solenoid Control Oil Line

When the pilot valves 32, 39 of the first and second proportional pressure reducing valves are not powered on, the oil of the solenoid control oil line 8 flows into the valve spool control oil ports 35, 42 of the first and second proportional pressure reducing valves and directly through the pilot valves 32, 39 of the first and second proportional pressure reducing valve, back to the oil tank 1, the main valves 31, 38 of the first and second proportional pressure reducing valves do not open, then the corresponding first and second lock-up clutches do not work.

After the pilot valve 32 of the first proportional pressure reducing valve is powered on, the valve spool thereof acts to totally seal the oil outlet, therefore the pressure at the valve spool control oil port 35 of the first proportional pressure reducing valve rises, in turn forces the valve spool of the main valve 31 of the first proportional pressure reducing valve to act, and causes the oil inlet 33 and oil outlet 34 of the first proportional pressure reducing valve to open, in turn forces the first lock-up clutch to act, thereby achieving its lock function. And after the pilot valve 32 of the first proportional pressure reducing valve is powered off again, the valve spool thereof returns to home position, the oil entering the valve spool control oil port 35 of the first proportional pressure reducing valve flows back to the oil tank 1 again and lowers the pressure. The valve spool of the main valve 31 of the first proportional pressure reducing valve resets and cuts off the oil line between the oil inlet 33 and oil outlet 34 thereof, thus releasing the first lock-up clutch.

The control principle of the opening and resetting of the second proportional pressure reducing valve 37 is the same as that of the first proportional pressure reducing valve 30.

At the same time the parking lock hydraulic oil cylinder 51 connected to the solenoid control oil line 8 is provided in parallel with the switch solenoid 50, so when the switch solenoid 50 is not powered on, the oil passing the oil orifice 49 flows back to the oil tank 1 directly through the switch solenoid 50, and therefore the parking lock hydraulic oil cylinder 51 does not work. When the switch solenoid 50 is powered on, the valve spool thereof acts to totally seal the oil line, then the oil passing the oil orifice 49 enters the parking lock hydraulic oil cylinder 51 and forces it to work, achieving the parking lock. When the switch solenoid 50 is powered off again, the valve spool thereof resets to open the oil line again. At this moment, the oil from the oil orifice 49 flows back to the oil tank 1 again and releases the pressure, thereby releasing the parking lock hydraulic oil cylinder 51.

What is claimed is:

1. A hydraulic control device for a hybrid transmission, comprising an oil pump and a main oil line connected therewith, said main oil line is connected to a cooling and lubrication oil line, a clutch control oil line and a solenoid control oil line respectively, the main oil line is connected to the cooling and lubrication oil line through an oil orifice on an unloading valve, the cooling and lubrication oil line at the same time is connected to a valve spool control oil port of the unloading valve, while an oil outlet of the unloading valve is connected to an oil inlet of an overflow valve and the clutch control oil line respectively, an oil outlet of the overflow valve is connected to the cooling and lubrication oil line, a cooler is provided on the cooling and lubrication oil line, the clutch control oil line is connected to oil inlets of first and second proportional pressure reducing valves respectively, a pressure reducing valve is provided between the solenoid control oil line and the main oil line, the solenoid control oil line is connected respectively to valve spool control oil ports of the first and second proportional pressure reducing valves through an oil orifice, and the solenoid control oil line is also connected to a switch solenoid and a parking lock hydraulic oil cylinder through the oil orifice respectively.

2. The hydraulic control device for a hybrid transmission of claim 1, wherein an accumulation shock absorber is provided on the clutch control oil line and the solenoid control oil line respectively.

3. The hydraulic control device for a hybrid transmission of claim 2, wherein the pressure in the main oil line is between approximately 7 bar and 9 bar.

4. The hydraulic control device for a hybrid transmission of claim 1, wherein the pressure in the main oil line is between approximately 7 bar and 9 bar.

5. The hydraulic control device for a hybrid transmission of claim 1, wherein when respective pilot valves of the first and second proportional pressure reducing valves are powered on, the first and second proportional pressure reducing valves control the engagement of first and second lock-up clutches of the hybrid transmission respectively through respective oil outlets of the first and second proportional pressure reducing valves.

6. The hydraulic control device for a hybrid transmission of claim 1, wherein when the switch solenoid is powered on, the parking lock hydraulic oil cylinder works to achieve parking lock.

7. The hydraulic control device for a hybrid transmission of claim 1, wherein an overpressure protection check valve in parallel with the cooler is provided on said cooling and lubrication oil line.

8. The hydraulic control device for a hybrid transmission of claim 7, wherein an accumulation shock absorber is provided on the clutch control oil line and the solenoid control oil line respectively.

9. The hydraulic control device for a hybrid transmission of claim 8, wherein the pressure in the main oil line is between approximately 7 bar and 9 bar.

10. The hydraulic control device for a hybrid transmission of claim 9, wherein the pressure in the solenoid control oil line is between approximately 4 bar and 6 bar.

11. The hydraulic control device for a hybrid transmission of claim 7, wherein the pressure in the main oil line is between approximately 7 bar and 9 bar.

12. The hydraulic control device for a hybrid transmission of claim 11, wherein the pressure in the solenoid control oil line is between approximately 4 bar and 6 bar.

13. The hydraulic control device for a hybrid transmission of claim 7, wherein when respective pilot valves of the first and second proportional pressure reducing valves are powered on, the first and second proportional pressure reducing valves control the engagement of first and second lock-up clutches of the hybrid transmission respectively through respective oil outlets of the first and second proportional pressure reducing valves.

14. The hydraulic control device for a hybrid transmission of claim 7, wherein when the switch solenoid is powered on, the parking lock hydraulic oil cylinder works to achieve parking lock.

* * * * *